(12) United States Patent
Masuda et al.

(10) Patent No.: US 8,375,318 B2
(45) Date of Patent: Feb. 12, 2013

(54) FILE MANAGEMENT APPARATUS AND IMAGE DISPLAY APPARATUS

(75) Inventors: Hiroki Masuda, Kanagawa (JP); Eriko Matsumura, Kanagawa (JP); Kensaku Ishizuka, Tokyo (JP); Masakazu Hayashi, Tokyo (JP); Masaru Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 1251 days.

(21) Appl. No.: 11/616,562

(22) Filed: Dec. 27, 2006

(65) Prior Publication Data
US 2007/0147178 A1    Jun. 28, 2007

(30) Foreign Application Priority Data
Dec. 28, 2005  (JP) ................... 2005-377665

(51) Int. Cl.
*G06F 3/048* (2006.01)
(52) U.S. Cl. ..................................... 715/772
(58) Field of Classification Search .............. 715/963, 715/772
See application file for complete search history.

(56) References Cited

U.S. PATENT DOCUMENTS

| | | | |
|---|---|---|---|
| 5,581,275 A | 12/1996 | Glei et al. | |
| 6,301,579 B1 * | 10/2001 | Becker | 1/1 |
| 6,380,953 B1 * | 4/2002 | Mizuno | 715/764 |
| 6,686,939 B1 * | 2/2004 | Haynes | 345/156 |
| 6,801,910 B1 * | 10/2004 | Bedell et al. | 1/1 |
| 6,990,637 B2 * | 1/2006 | Anthony et al. | 715/851 |
| 7,643,706 B2 * | 1/2010 | Wagner et al. | 382/309 |
| 2002/0054103 A1 * | 5/2002 | Mizuno | 345/764 |
| 2003/0174173 A1 | 9/2003 | Nishiyama et al. | |
| 2004/0125150 A1 * | 7/2004 | Adcock et al. | 345/810 |

(Continued)

FOREIGN PATENT DOCUMENTS

| | | |
|---|---|---|
| JP | 10-4533 | 1/1998 |
| JP | 11-212700 | 8/1999 |

(Continued)

OTHER PUBLICATIONS

Adrian Graham, et al. "Time As Essence for Photo Browsing Through Personal Digital Libraries", IEEE-CS Joint Conference on Digital Libraries, XP-002383768, vol. conf. 2, Jul. 14, 2002, 10 pages.

(Continued)

*Primary Examiner* — William Bashore
*Assistant Examiner* — Henry Orr
(74) *Attorney, Agent, or Firm* — Oblon, Spivak, McClelland, Maier & Neustadt, L.L.P.

(57) ABSTRACT

A file management apparatus includes the following elements: a representative image storage device storing representative image data of each of a plurality of content files in association with a creation time of the content file; a rendering unit rendering the representative image data at a position corresponding to the creation time with a calendar continuous over days, months, and years serving as a background; a display state maintaining unit maintaining, as a display state, a time-axis range of the calendar being displayed and a position thereof; an operation receiving unit receiving a change operation to change the display state, the change operation commonly being a scrolling operation in a time-series direction in any time-axis range; and a controller controlling, in response to the change operation, the rendering means to render the representative image data on the calendar on the basis of the display state.

18 Claims, 14 Drawing Sheets

U.S. PATENT DOCUMENTS

| | | | |
|---|---|---|---|
| 2005/0091596 A1* | 4/2005 | Anthony et al. | 715/712 |
| 2005/0210411 A1 | 9/2005 | Morita | |
| 2006/0114256 A1* | 6/2006 | Kaminaga | 345/440 |
| 2006/0156259 A1* | 7/2006 | Wagner et al. | 715/963 |

FOREIGN PATENT DOCUMENTS

| | | | |
|---|---|---|---|
| JP | 2000-32241 | | 1/2000 |
| JP | 2000-90252 | | 3/2000 |
| JP | 2001-5788 | | 1/2001 |
| JP | 2001-167170 | | 6/2001 |
| JP | 2003-177950 | | 6/2003 |
| JP | 2003-228587 | | 8/2003 |
| JP | 2003228587 A | * | 8/2003 |
| JP | 2003331258 A | * | 11/2003 |
| JP | 2004-46796 | | 2/2004 |
| JP | 2004-297649 | | 10/2004 |
| JP | 2005-33711 | | 2/2005 |
| JP | 2005-202944 | | 7/2005 |
| JP | 2005-269011 | | 9/2005 |

OTHER PUBLICATIONS

"Zooming on Visual Calendar Data", Mason Publications Research Disclosure, XP-007116799, vol. 329, No. 19, Sep. 1991, 1 page.

"Partial Access Scrollable Calendar Window", IBM Technical Disclosure Bulletin, XP-000441521, vol. 37, No. 3, Mar. 1, 1994, p. 411.

Yuichi Koike et al, "TimeSlider: An Interface to Specify Time Point," UIST '97, 10th Annual Symposium on User Interface Software and Technology. Proceedings of the ACM Symposium on User interface Software and Technology. Banff, Alberta, Canada, Oct. 14-17, 1997; ACM Symposium on User Interface Software and Technology, Oct. 17, 1997, pp. 43-44. XP009074765.

European Patent Office Communication dated Feb. 11, 2011, in corresponding European application 06 126 921.3-1225.

Japanese Office Action issed Dec. 6, 2011, in Patent Application No. 2010-228315 (with English-language translation).

Takashi Ageoka, "Technique for Arranging Files Visually and Efficiently by Using Dedicated Software", Nikkei Personal Computing, Nikkei Business Publications, Inc., No. 453, Fig. 19, Mar. 15, 2004, p. 134-137.

Yuya Ito, "Adobe Photo shop Album 2.0", Adobe Systems, ASCII Corporation, vol. 28, Jan. 2004, pp. 150-151.

Nobukatsu Hiranotani, "Expert of Digital Camera, Version 1.0", Oh! PC, Softbank Corporation, vol. 17, No. 4, 1998, Part 132, p. 133, 2 pages.

Office Action issued Feb. 28, 2012, in Japanese Patent Application No. 2010-228315.

* cited by examiner

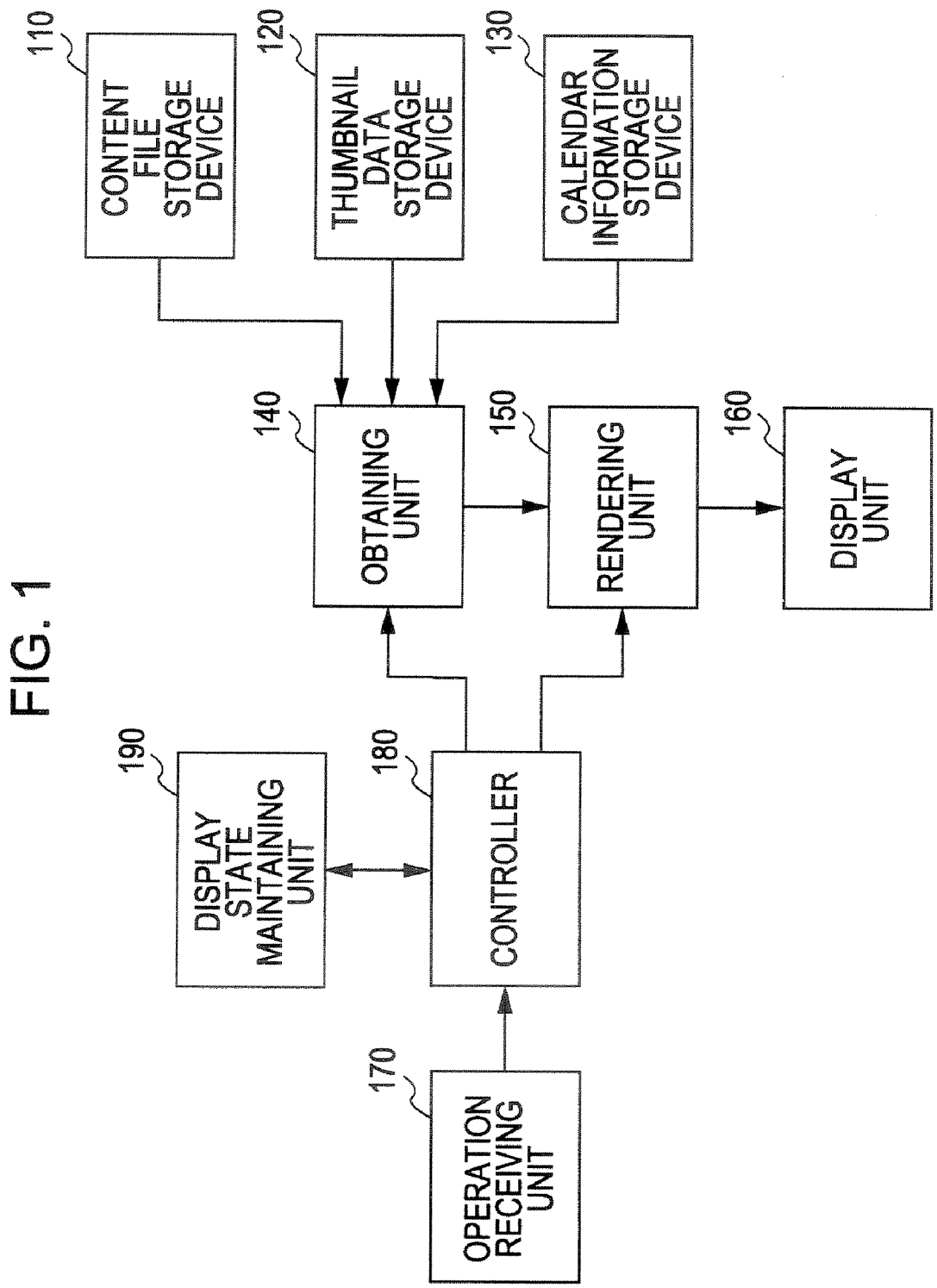

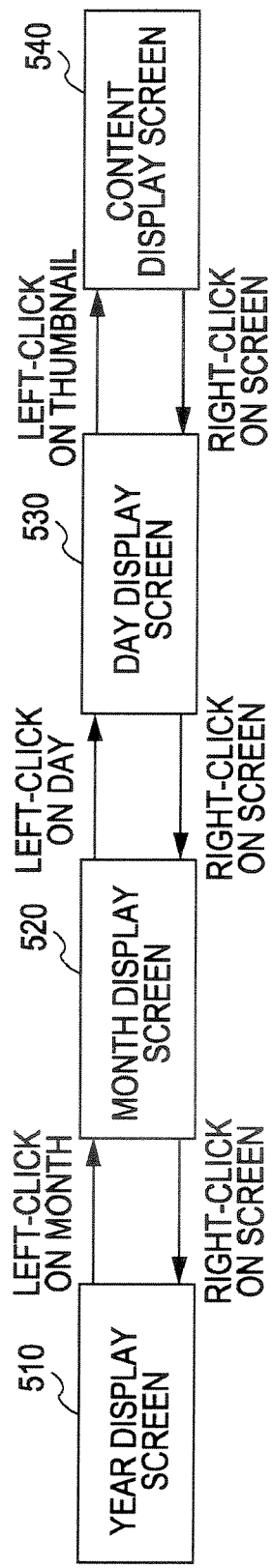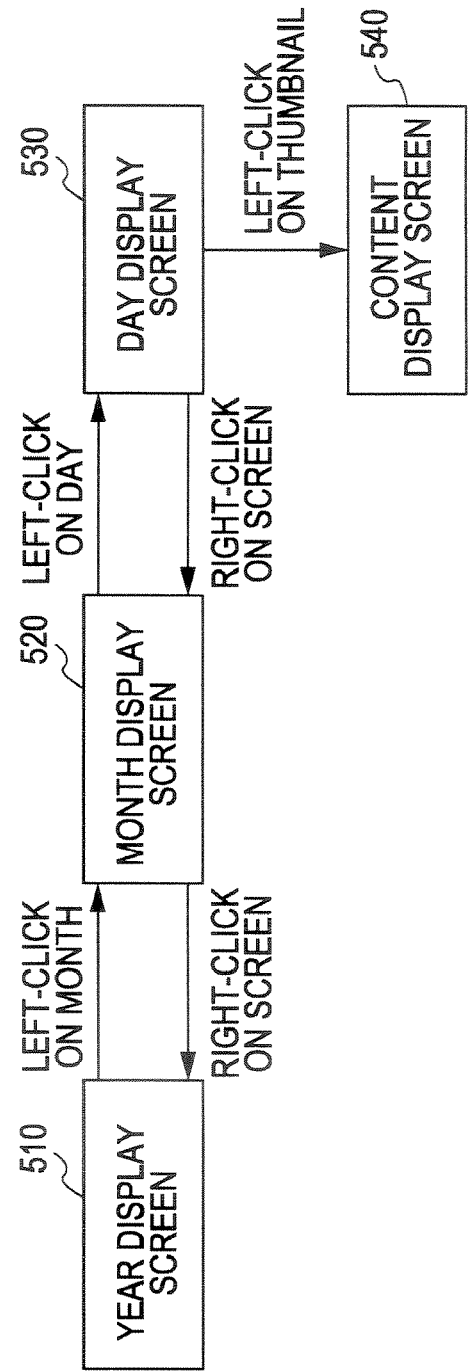

FILE MANAGEMENT APPARATUS AND IMAGE DISPLAY APPARATUS

CROSS REFERENCES TO RELATED APPLICATIONS

The present invention contains subject matter related to Japanese Patent Application JP 2005-377665 filed in the Japanese Patent Office on Dec. 28, 2005, the entire contents of which are incorporated herein by reference.

BACKGROUND OF THE INVENTION

1. Field of the Invention

The present invention relates to file management apparatuses, and more particularly relates to a file management apparatus for managing content files on a calendar, an image display apparatus for playing and displaying the content files, a processing method therefor, and a program for allowing a computer to execute the method.

2. Description of the Related Art

As digital still cameras and digital video cameras become more widely used, an increasing number of users are creating content files (still image files, moving image files, audio files, etc.). It is difficult for the users to remember all the content files, and it is likely that the content files remain unorganized.

To solve this problem, known apparatuses are available for managing content files by displaying their representative images on a calendar on the basis of their creation time, namely, the time, day, month, and year on which the content files are created. For example, an information processing apparatus for displaying a list of captured image files according to the capturing date or time is proposed in Japanese Unexamined Patent Application Publication No. 2005-33711 (FIG. 31).

SUMMARY OF THE INVENTION

Since representative images are displayed on a calendar in the related art described above, a browsing method of recognizing in advance images created on a specific date and purposefully searching for a target image fully satisfies its purpose.

However, the aforementioned related art is not necessarily suitable for a browsing method of browsing and enjoying various past content files without setting a specific date. That is, even though the calendar, which is a display system with time as an important concept, is adopted in the related art, the concept of the directivity of time is not represented as a consistent user interface on a display screen displaying a time-axis range expressed in units of days, months, or years. It is thus difficult for a user to recognize the time axis from the user interface and, as a result, it is difficult for the user to intuitively search the reprehensive images or to browse the representative images as if taking a stroll.

In the related art, images displayed at a time are arranged in units of days. It is thus difficult for the user to collectively browse a group of representative images captured over a plurality of days, as in a trip for example.

It is desirable to provide a seamless user interface for displaying representative images of content files on calendars with time-axis ranges expressed in units of days, months, and years by unifying time-series directions of the calendars.

According to a first embodiment of the present invention, there is provided a file management apparatus including the following elements: representative image storage means for storing representative image data of each of a plurality of content files in association with a creation time of the content file; rendering means for rendering the representative image data at a position corresponding to the creation time with a calendar continuous over days, months, and years serving as a background; display state maintaining means for maintaining, as a display state, a time-axis range of the calendar being displayed and a position thereof; operation receiving means for receiving a change operation to change the display state, the change operation commonly being a scrolling operation in a time-series direction in any time-axis range; and control means for controlling, in response to the change operation, the rendering means to render the representative image data on the calendar on the basis of the display state. Accordingly, there is provided a seamless file management apparatus that allows a user not to recognize the day, month, and year boundaries by displaying representative image data on the calendar in which the time-series direction is independent of the time-axis range.

According to the first embodiment, the time-axis range may be expressed in units of days, months, or years. That is, a year display screen, a month display screen, or a day display screen may be displayed as a display screen displaying the calendar serving as the background of representative images.

According to the first embodiment, the rendering means may render an image indicating the units in accordance with the units of the time-axis range. That is, the rendering means may render the year display screen, the month display screen, and the day display screen.

According to the first embodiment, the rendering means may render units other than a core unit as inactive in accordance with the units of the time-axis range. The term "core unit" is a mainly displayed year in the case of the year display screen, a mainly displayed month in the case of the month display screen, or a mainly displayed day in the case of the day display screen. The core unit can be specified as a unit (day, month, or year) with the largest display area among the units (days, months, or years). The phrase "render units other than a core unit as inactive" means, for example, that the other units are grayed out. In this case, the other units are displayed using a color lighter than that of the core unit. Alternatively, when the core unit is displayed in color, the other units may be displayed in monochrome. Alternatively, when the other units may be displayed in a lower contrast. That is, the phrase "render units other than a core unit as inactive" includes the cases where the other units are displayed so that the other units are not striking to the eye.

According to the first embodiment, the rendering means may render information about the core unit when the calendar crosses a boundary of the units of the time-axis range during the scrolling operation. Accordingly, a newly displayed position can be clearly indicated when the calendar, which is assumed to be continuous over the units of the time-axis range, crosses the boundary of the units of the time-axis range.

According to the first embodiment, in the case where the time-axis range is expressed in units of months, when a day on the calendar is selected, the control means may switch the time-axis range so that the time-axis range is expressed in units of days. When the creation time belongs to the selected day, the rendering means may render an image indicating the selected day. When the creation time does not belong to the selected day, the rendering means may render an image indicating a closest future day to which the creation time belongs. Accordingly, a day on which a content file is created is displayed with a higher priority.

According to the first embodiment, when the time-axis range is expressed in units of days, the rendering means may render the calendar and the representative image data only for a day to which the creation time belongs. Accordingly, a redundant blank area may be omitted.

According to the first embodiment, when the time-axis range is expressed in units of days, the rendering means may render an image indicating a break point between groups, each group serving as a range of continuous days to which the creation times belong. Accordingly, content files belonging to a specific event can be collectively managed on the calendar continuous over days.

According to the first embodiment, when the time-axis range is expressed in units of days, the rendering means may render an image to be displayed from the content file corresponding to the representative image data selected on the calendar. Accordingly, the contents of each content file can be recognized from the day display screen. In this case, the rendering means may render, together with the rendered image, representative image data belonging to a group serving as a range of continuous days to which the creation times belong. Accordingly, ease of accessibility to content files belonging to a specific event can be enhanced.

According to the first embodiment, the operation receiving means may receive a movement operation to move a cursor. The rendering means may render the cursor in accordance with the movement operation, and, when the cursor is moved over one of the units of the time-axis range, the rendering means may render information about the unit. This realizes a so-called "tool tip" serving as means for enabling the user to recognize a distribution of creation days, months, and years of content files using a simple operation.

According to the first embodiment, when the operation receiving means is a mouse receiving at least first and second clicking operations, the control means may switch the time-axis range so that the time-axis range is expressed in smaller units in response to the first clicking operation and may switch the time-axis range so that the time-axis range is expressed in larger units in response to the second clicking operation. Accordingly, the transition of the screen from the year display screen to the day display screen can be realized by an intuitive operation.

According to a second embodiment of the present invention, there is provided an image display apparatus including the following elements: representative image storage means for storing representative image data of each of a plurality of content files in association with a creation time of the content file; rendering means for rendering the representative image data at a position corresponding to the creation time with a calendar continuous over days, months, and years serving as a background; display state maintaining means for maintaining, as a display state, a time-axis range of the calendar being displayed and a position thereof; operation receiving means for receiving a change operation to change the display state, the change operation commonly being a scrolling operation in a time-series direction in any time-axis range; control means for controlling, in response to the change operation, the rendering means to render the representative image data on the calendar on the basis of the display state; and display means for displaying details rendered by the rendering means. Accordingly, representative image data can be displayed by a seamless operation without involving a user recognizing the day, month, and year boundaries, with the calendar in which the time-series direction is independent of the time-axis range serving as a background.

According to a third embodiment of the present invention, there is provided a file management method including the following steps or a program for allowing a computer to execute the following steps of rendering representative image data of each of a plurality of content files at a position corresponding to a creation time of the content file with a calendar continuous over days, months, and years serving as a background; receiving a change operation to change a time-axis range of the calendar being displayed and a position thereof, the change operation commonly being a scrolling operation in a time-series direction in any time-axis range; switching, when the change operation is a first clicking operation, the time-axis range so that the time-axis range is expressed at the position in smaller units; and switching, when the change operation is a second clicking operation, the time-axis range so that the time-axis range is expressed at the position in larger units. Accordingly, there is provided a seamless file management method that allows a user not to recognize the day, month, and year boundaries by displaying representative image data on the calendar in which the time-series direction is independent of the time-axis range.

According to the embodiments of the present invention, there is provided a seamless user interface for displaying representative images of content files on calendars with time-axis ranges expressed in units of days, months, and years by unifying time-series directions of the calendars.

BRIEF DESCRIPTION OF THE DRAWINGS

FIG. 1 is a block diagram of a file management apparatus or an image display apparatus according to an embodiment of the present invention;

FIGS. 2A to 2C are diagrams showing the outline of display modes according to the embodiment of the present invention;

FIGS. 3A and 3B are diagrams showing transitions of a display screen according to the embodiment of the present invention;

DESCRIPTION OF THE PREFERRED EMBODIMENTS

Figure 4:
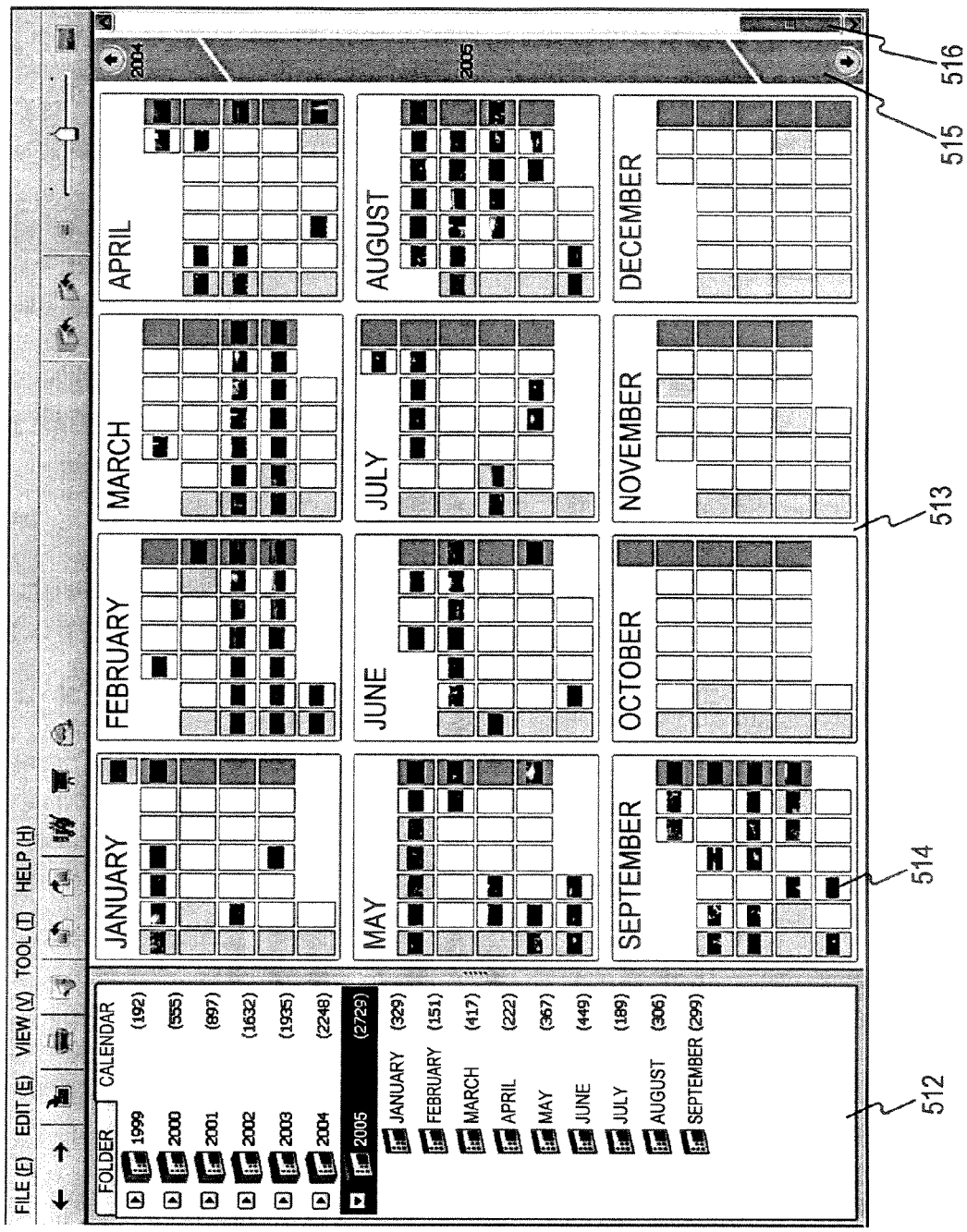
FIG. 4 is a diagram showing an example of a year display screen according to the embodiment of the present invention.

Embodiments of the present invention will be described in detail with reference to the drawings.

FIG. 1 a diagram showing an exemplary structure of a file management apparatus or an image display apparatus according to an embodiment of the present invention. The file management apparatus includes a content file storage device 110, a thumbnail data storage device 120, a calendar information storage device 130, an obtaining unit 140, a rendering unit 150, a display unit 160, an operation receiving unit 170, a controller 180, and a display state maintaining unit 190.

The content file storage device 110 stores content files such as still image files, moving image files, and audio files. The content files have attribute information, such as the creation time of the content files, as meta data. The creation time refers to all or part of the time, day, month, and year on which the content files are created.

The thumbnail data storage device 120 stores thumbnail data of the content files stored in the content file storage device 110 as representative images. The thumbnail data includes a reduced image for a still image file and a reduced image of a frame at a certain time for a moving image file. Also, the thumbnail data includes a visual effect image at a certain time for an audio file. When storing a piece of thumbnail data, the thumbnail data storage device 120 preferably associates the piece of thumbnail data with the creation time of the associated content file. In this way, the thumbnail data can be quickly read using the creation time as an index key.

The calendar information storage device 130 stores information (calendar information) necessary for creating a calendar. Such information corresponds to information regarding the relationship between the date and the day of the week, holidays, and leap years.

The obtaining unit 140 accesses the content file storage device 110, the thumbnail data storage device 120, and the calendar information storage device 130 to obtain the contents thereof.

The rendering unit 150 renders a calendar on the basis of the calendar information stored in the calendar information storage device 130 and renders pieces of thumbnail data stored in the thumbnail data storage device 120 at associated positions on the calendar. In response to a request to play a content file via the associated thumbnail data, the rendering unit 150 renders an image to be displayed from the requested content file.

The display unit 160 displays the details rendered by the rendering unit 150. The display unit 160 can be realized by a display such as a liquid crystal display (LCD). Alternatively, the display unit 160 may be a touch panel, for example, and integrated with the operation receiving unit 170.

The operation receiving unit 170 receives user operations. According to the embodiment of the present invention, a pointing device such as a mouse is assumed as the operation receiving unit 170. However, the operation receiving unit 170 may be realized as a touch panel integrated with the display unit 160.

In accordance with the operations received by the operation receiving unit 170, the controller 180 controls the obtaining unit 140 and the rendering unit 150. That is, the controller 180 allows the obtaining unit 140 to obtain calendar information and pieces of thumbnail data necessary to render the calendar and the associated images, and, on the basis of the obtained information and data, allows the rendering unit 150 to render the pieces of thumbnail data at associated positions on the calendar. In response to a request to play a content file, the controller 180 allows the rendering unit 150 to render an image to be displayed from the requested content file.

The display state maintaining unit 190 maintains, as a display state, a time-axis range of the calendar being displayed and a position thereof. The time-axis range can be expressed in units of days, months, or years. The position may be expressed on the basis of the time, day, month, and year. By maintaining the current display state in the display state maintaining unit 190, in response to an instruction to change the time-axis range, a changed time-axis range and the current position can be detected, and the time-axis range can be switched while maintaining the current position.

Figures 2A, 2B, 2C:
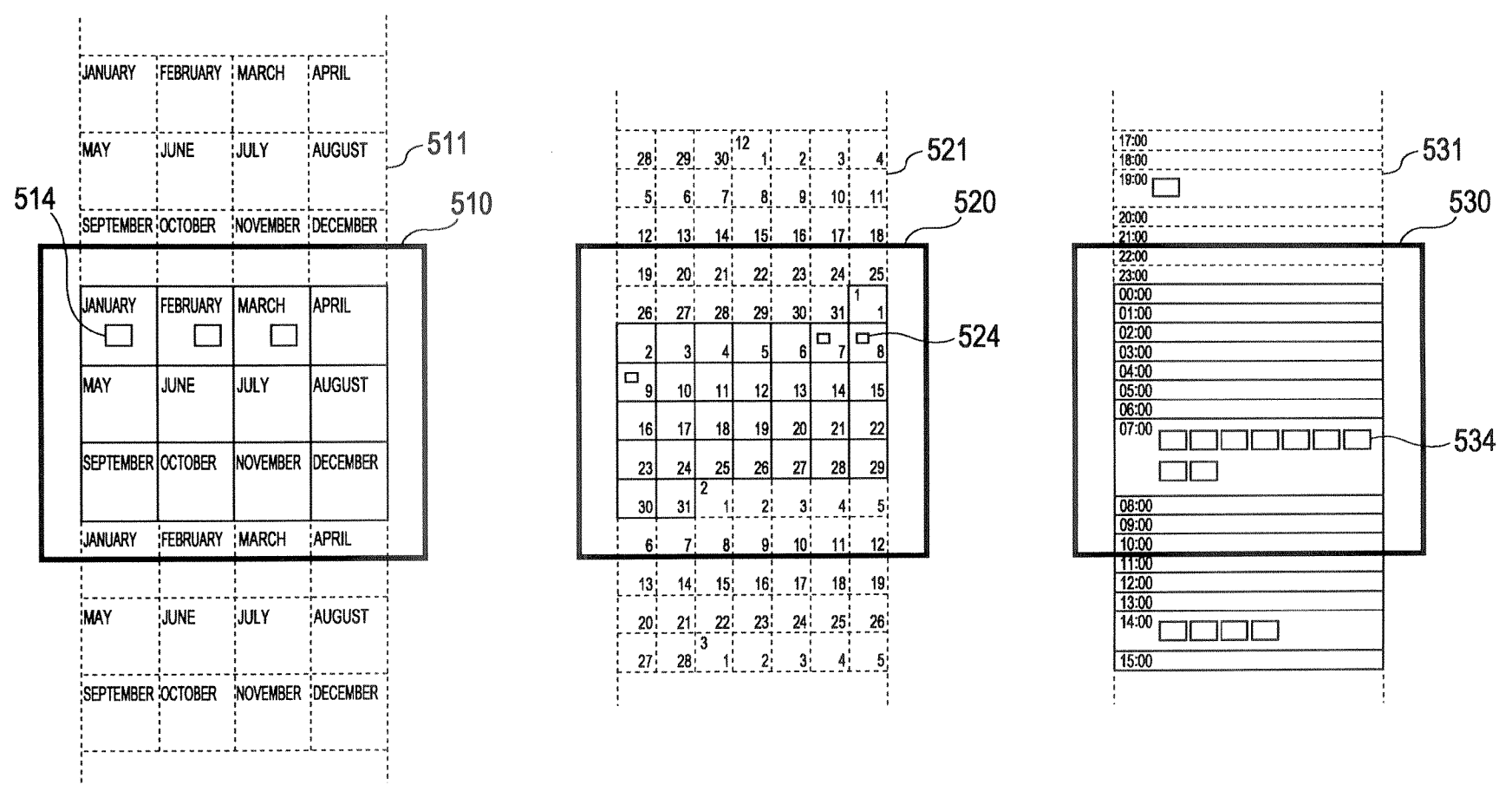

FIGS. 2A to 2C are diagrams showing the outline of display modes according to the embodiment of the present invention. FIG. 2A shows an exemplary display mode in the case where the time-axis range is selected to be in units of years. A yearly calendar 511 (in units of years) serving as a background is continuous over years. Thus, a year display screen 510 displays part of the calendar 511.

In each of a plurality of months of the calendar 511, thumbnail data 514 is rendered at a position corresponding to the creation month of the associated content file. As a rendering mode of the thumbnail data 514, one piece of representative thumbnail data may be rendered per month. Alternatively, as shown in FIG. 4, each month may be displayed in a calendar format, and one piece of representative thumbnail data may be rendered per day.

FIG. 2B shows an exemplary display mode in the case where the time-axis range is selected to be in units of months. A monthly calendar 521 (in units of months) serving as a background is continuous over months. As in the year display screen 510, a month display screen 520 displays part of the calendar 521.

In each of a plurality of days of the calendar 521, thumbnail data 524 is rendered at a position corresponding to the creation day of the associated content file. As a rendering mode of the thumbnail data 524, one piece of representative thumbnail data may be rendered per day. Alternatively, a plurality of pieces of thumbnail data may be rendered in a tile format.

FIG. 2C shows an exemplary display mode in the case where the time-axis range is selected to be in units of days. A daily calendar 531 (in units of days) serving as a background is continuous over days. As in the year display screen 510 and the month display screen 520, a day display screen 530 displays part of the calendar 531.

Each of a plurality of days of the calendar 531 is divided into time slots in units of hours, and thumbnail data 534 is rendered at a position corresponding to the creation time of the associated content file. Besides the thumbnail data 534, the creation time may additionally be displayed. When a plurality of corresponding pieces of thumbnail data exist in the same time slot, all the pieces of thumbnail data are rendered, for example, in the order of creation (time). Although the case in which the time slots are expressed in units of hours has been described, the time slots may be set in other appropriate units.

The display screens 510, 520, and 530 are common in terms of scrolling operations in a time series direction. The display screens 510, 520, and 530 are moved in a temporally older direction when moved upward relative to the calendar by upward scrolling and are moved in a temporally newer direction when moved downward relative to the calendar by downward scrolling. This provides a user interface that can be used with the same scrolling operation on the screen in any time-axis range.

The display screens 510, 520, and 530 have, as the background, the calendars continuous over the years, months, and days, respectively. Even when each calendar crosses the associated year, month, or day boundary during scrolling, the displayed calendar is not interrupted. Therefore, in the case shown in FIG. 2A where the time-axis range is expressed in units of months, it is not necessary to return to the year display screen 510 when moving from displaying a certain month to another month. It is also unnecessary to literally press a button for displaying another month. That is, there is provided a user interface that can seamlessly display days, months, and years by scrolling operations.

FIGS. 3A and 3B are diagrams showing transitions of a display screen according to the embodiment of the present invention. The embodiment of the present invention will be described in the case where a mouse having at least two buttons (a left button and a right button) is assumed as an example of the operation receiving unit 170.

FIG. 3A shows the case where the year display screen 510, the month display screen 520, the day display screen 530, and a content display screen 540 are displayed on the same screen (window display screen). When the left button of the mouse is pressed while the cursor is positioned on a specific month area on the year display screen 510, that is, when the specific month area is left-clicked, the month display screen 520 displaying the specific month is displayed. By left-clicking the mouse while the cursor is positioned on a specific day area on the month display screen 520, the day display screen 530 displaying the specific day is displayed. That is, the time-axis range is changed to be expressed in smaller units by left-clicking.

When the display screen is changed by changing the time-axis range by left-clicking, the controller 180 updates the display state maintaining unit 190 so as to maintain the new time-axis range and position. When the position to be displayed is changed by scrolling each display screen, the controller 180 updates the display state maintaining unit 190 so as to maintain the new position.

In contrast, when the right button of the mouse is pressed on the day display screen 530, that is, when the day display screen 530 is right-clicked, the month display screen 520 displaying a month to which the day of the day display screen 530 belongs is displayed. By right-clicking on the month display screen 520, the year display screen 510 displaying a year to which the month of the month display screen 520 belongs is displayed. That is, the time-axis range is changed to be expressed in larger units by right-clicking.

When the display screen is changed by changing the time-axis range by right-clicking, the controller 180 reads the display state maintained in the display state maintaining unit 190 and allows the rendering unit 150 to render a new display screen on the basis of the read display state. Also, the controller 180 updates the display state maintaining unit 190 so as to maintain the time-axis range of the new display screen.

By left-clicking the mouse while the cursor is positioned on a specific piece of the thumbnail data 534 on the day display screen 530, the content display screen 540 displaying a content file associated with this specific piece of the thumbnail data 534 is displayed. By right-clicking on the content display screen 540, the day display screen 530 displaying the creation day of the content file is displayed.

FIG. 3B shows the case where the content display screen 540 is displayed on another screen (window display screen). The transition from the year display screen 510 to the day display screen 530 and the transition from the day display screen 530 to the year display screen 510 are the same as those in FIG. 3A.

By left-clicking the mouse while the cursor is positioned on a specific piece of the thumbnail data 534 on the day display screen 530, the content display screen 540 is displayed as a separate screen displaying a content file associated with this specific piece of the thumbnail data 534. At this time, the original day display screen 530 is maintained and remains unchanged.

FIG. 4 shows an example of the year display screen 510 according to the embodiment of the present invention. The year display screen 510 includes an area 512 displaying the calendar structure and a calendar display area 513 displaying a yearly calendar whose time-axis range is expressed in units of years.

In the area 512, the number of the corresponding content files created per year is displayed, and additionally the number of content files created per month may be displayed. When a creation year is selected in the area 512, a yearly calendar of that year is displayed in the calendar display area 513. In this example, the yearly calendar is divided into months from January to December, and each month is further divided into days arranged horizontally according to the days of the week. In each day, the thumbnail data 514 representing that creation day is rendered.

A scroll bar 516 is displayed on the right side of the calendar display area 513. Since the yearly calendar is continuous over years, a calendar of another year can be displayed seamlessly by operating the scroll bar 516.

A year display bar 515 is displayed on the left side of the scroll bar 516. The year displayed in the calendar display area 513 is indicated at the center of the year display bar 515. The previous year is indicated at the top of the year display bar 515, and the subsequent year is indicated at the bottom of the year display bar 515. Since the yearly calendar is continuous over years, the year display bar 515 is provided to clearly indicate the currently displayed year.

Depending on the display mode of the calendar display area 513, a plurality of years may be displayed on the same screen. In that case, a year with the largest display area among the years may be regarded as a core year, and this year may be displayed at the center of the year display bar 515. In this case, the years other than the core year may be rendered as inactive and grayed out using, for example, a lighter color.

Figure 5:
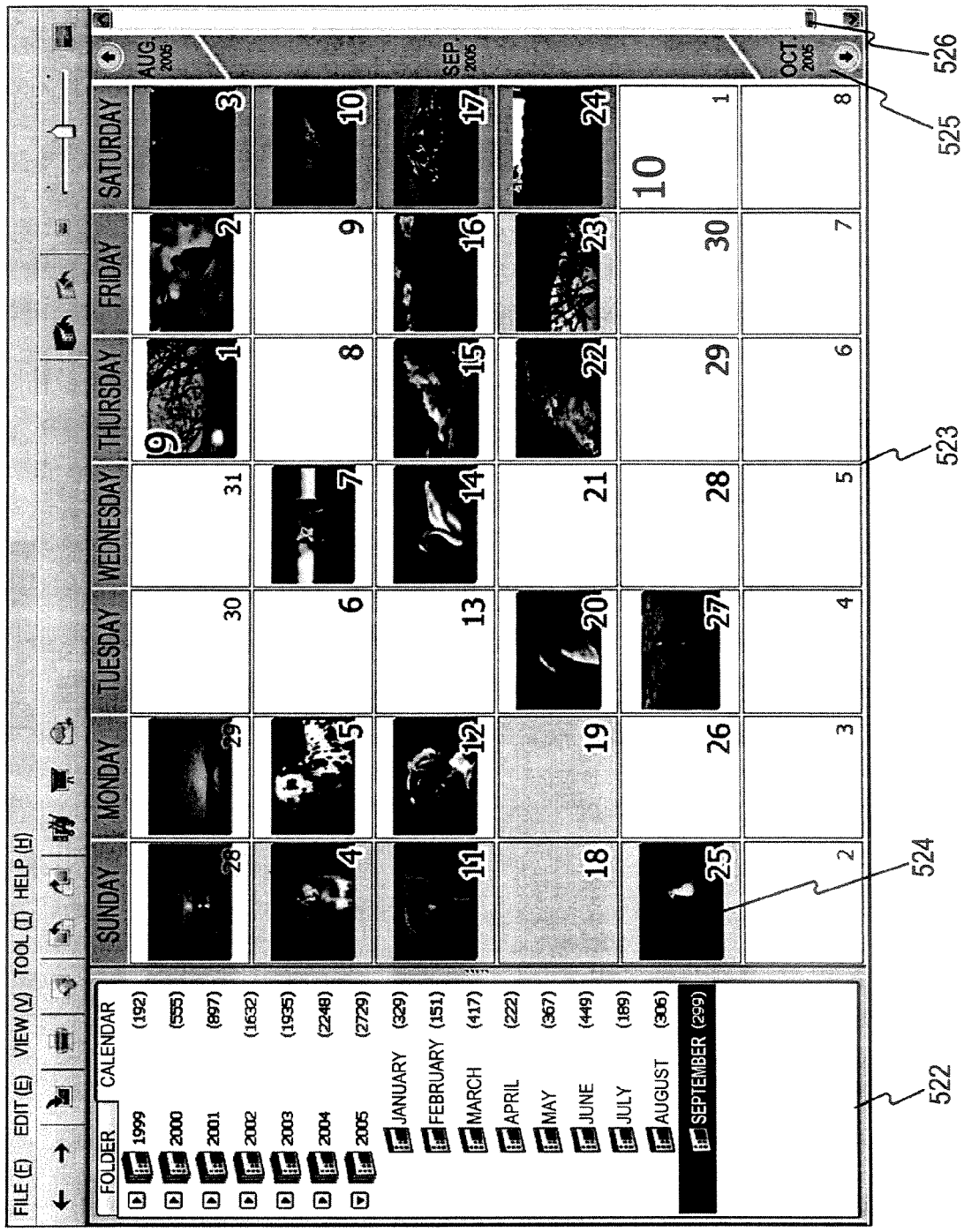
FIG. 5 is a diagram showing an example of a month display screen according to the embodiment of the present invention.

FIG. 5 shows an example of the month display screen 520 according to the embodiment of the present invention. The month display screen 520 includes an area 522 displaying the calendar structure and a calendar display area 523 displaying a monthly calendar whose time-axis range is expressed in units of months.

In the area 522, the number of the corresponding content files created per year is displayed, and additionally the number of content files created per month may be displayed. When a creation month is selected in the area 522, a monthly calendar of that month is displayed in the calendar display area 523. In this example, the calendar of September is displayed in which the days from Sunday to Saturday are arranged horizontally. The monthly calendar is divided into days from the first to the thirtieth day. In each day, the thumbnail data 524 representing that creation day is rendered.

A scroll bar 526 is displayed on the right side of the calendar display area 523. Since the monthly calendar is continuous over months, a calendar of another month can be displayed seamlessly by operating the scroll bar 526.

A month display bar 525 is displayed on the left side of the scroll bar 526. The month displayed in the calendar display area 523 is indicated at the center of the month display bar 525. The previous month is indicated at the top of the month display bar 525, and the subsequent month is indicated at the bottom of the month display bar 525. Since the monthly calendar is continuous over months, the month display bar 525 is provided to clearly indicate the currently displayed month.

Depending on the day of the week, a plurality of months may be displayed on the same screen. In that case, a month with the largest display area among the months may be regarded as a core month, and this month may be displayed at the center of the month display bar 525. In this case, the months other than the core month may be rendered as inactive using a lighter color.

Figure 6:
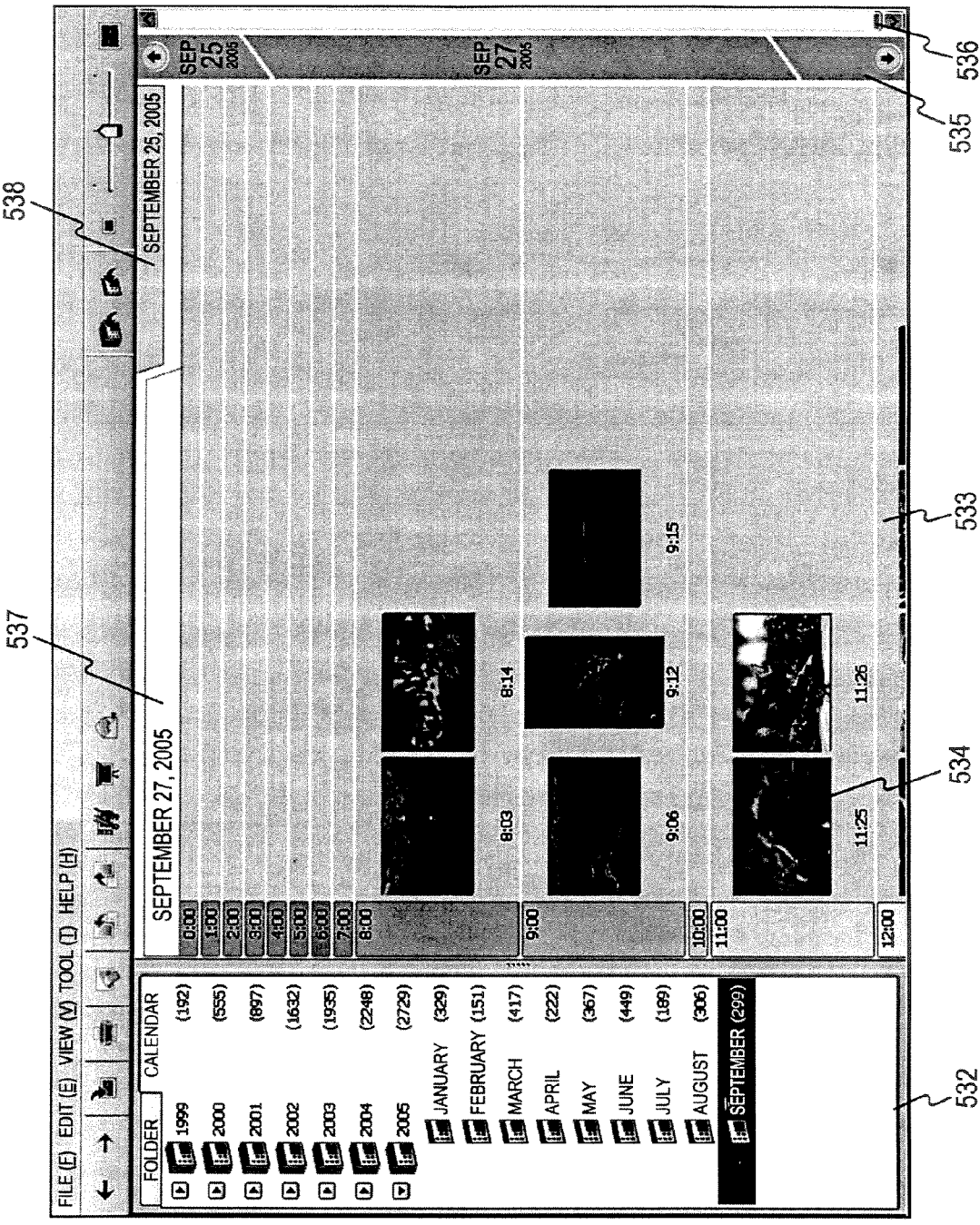
FIG. 6 is a diagram showing an example of a day display screen according to the embodiment of the present invention.

FIG. 6 shows an example of the day display screen 530 according to the embodiment of the present invention. The day display screen 530 includes an area 532 displaying the calendar structure and a calendar display area 533 displaying a daily calendar whose time-axis range is expressed in units of days.

In the area 532, the number of the corresponding content files created per year is displayed, and additionally the number of content files created per month may be displayed. As a modification, the number of content files created per day may additionally be displayed.

In the calendar display area 533, each day is divided into time slots in units of hours, and the thumbnail data 534 is rendered at a position corresponding to the creation time of the associated content file. In this example, the creation time is displayed below the thumbnail data 534.

A scroll bar 536 is displayed on the right side of the calendar display area 533. Since the daily calendar is continuous over days, a calendar of another day can be displayed seamlessly by operating the scroll bar 536.

However, when a day on which no content files are created is displayed, it becomes necessary to continuously scroll the calendar having no thumbnail data 534. In this example, this problem is solved by omitting days on which no content files are created from the calendar display area 533. In this case, when a specific day is left-clicked on the month display screen 520, there may be no content files whose creation day corresponds to the specific day. In such a case, a day on which a content file is created and which is closest to the specific day may be displayed on the day display screen 530. Specifically, a temporally future day, namely, a temporally new day, may be selected as the closest day.

In contrast, when the creation days of content files are continuous in units of days, it may be estimated that a certain event (e.g., a trip) has taken place over a plurality of days. Preferably, these content files within a continuous range may be organized into a group. A label 537 indicating the start day is displayed at the beginning of the group, and a label 538 indicating the last day is displayed at the end of the group. The labels 537 and 538 may be colored if necessary. For example, a label on Saturday may be colored blue, and a label on Sunday may be colored red.

A day display bar 535 is displayed on the left side of the scroll bar 536. The day displayed in the calendar display area 533 is indicated at the center of the day display bar 535. The previous day is indicated at the top of the day display bar 535, and the next day is indicated at the bottom of the day display bar 535. Since the daily calendar is continuous over days, the day display bar 535 is provided to clearly indicate the currently displayed day. The previous day and the next day are, as has been described above, days from which those on which no content files are created are omitted.

In the case where a plurality of days is displayed on the same screen, the day with the largest display area among the days may be regarded as a core day, and this day may be displayed at the center of the day display bar 535. In this case, the days other than the core day may be rendered as inactive using a lighter color.

Figure 7:
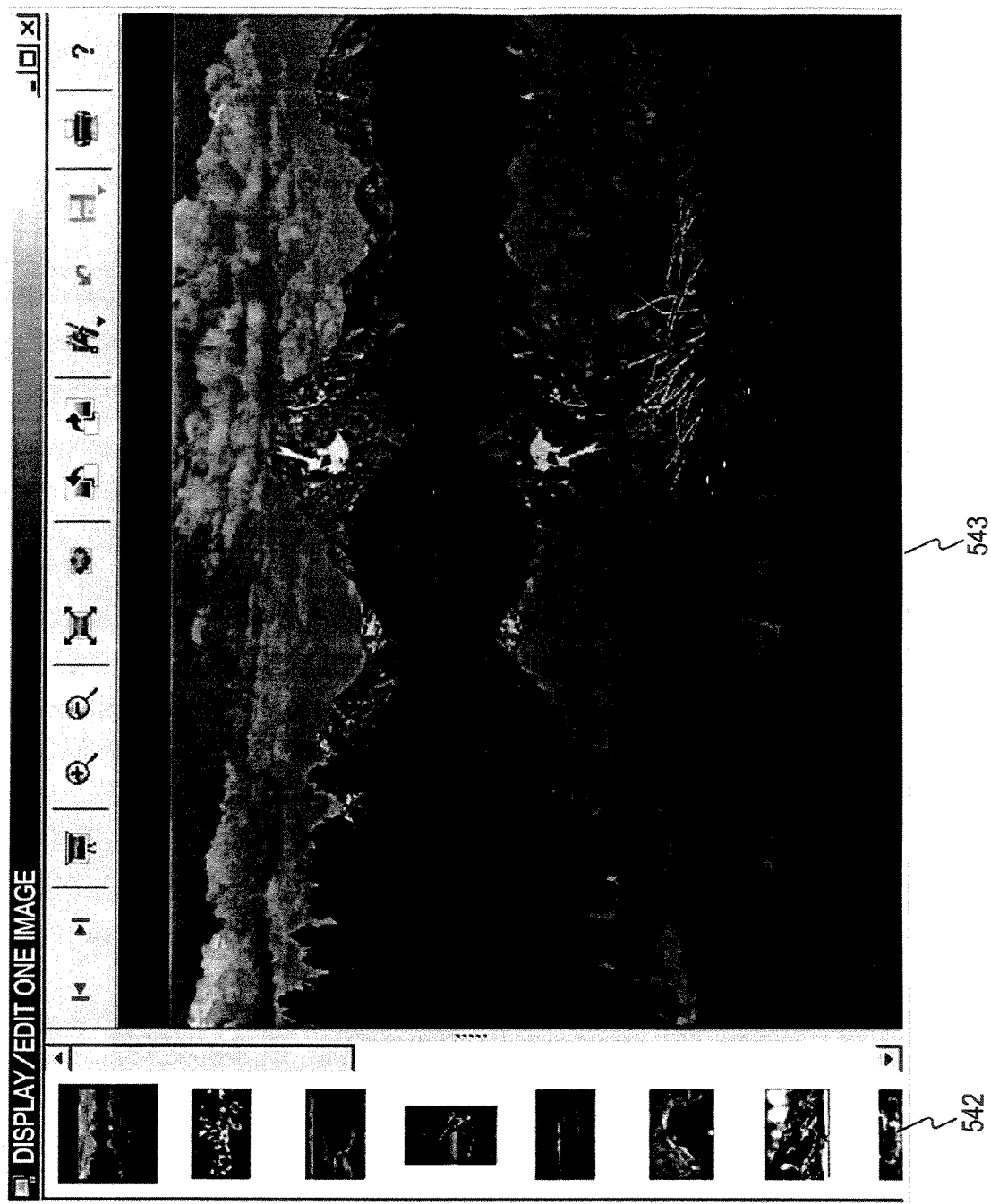
FIG. 7 is a diagram showing an example of a content display screen according to the embodiment of the present invention.

FIG. 7 shows an example of the content display screen 540 according to the embodiment of the present invention. The content display screen 540 includes an area 542 displaying thumbnail data and a content file playing/displaying area 543.

When a specific piece of thumbnail data is selected in the area 542, an image to be displayed is rendered in the area 543 from the content file corresponding to the selected thumbnail data. In the area 542, pieces of thumbnail data belonging to the above-described group may be arranged, and a target piece of thumbnail data to be played/displayed may be selected from the group.

The content file displayed in the area 543 may be enlarged or reduced in size using a group of tools provided above the area 543.

Figure 8:
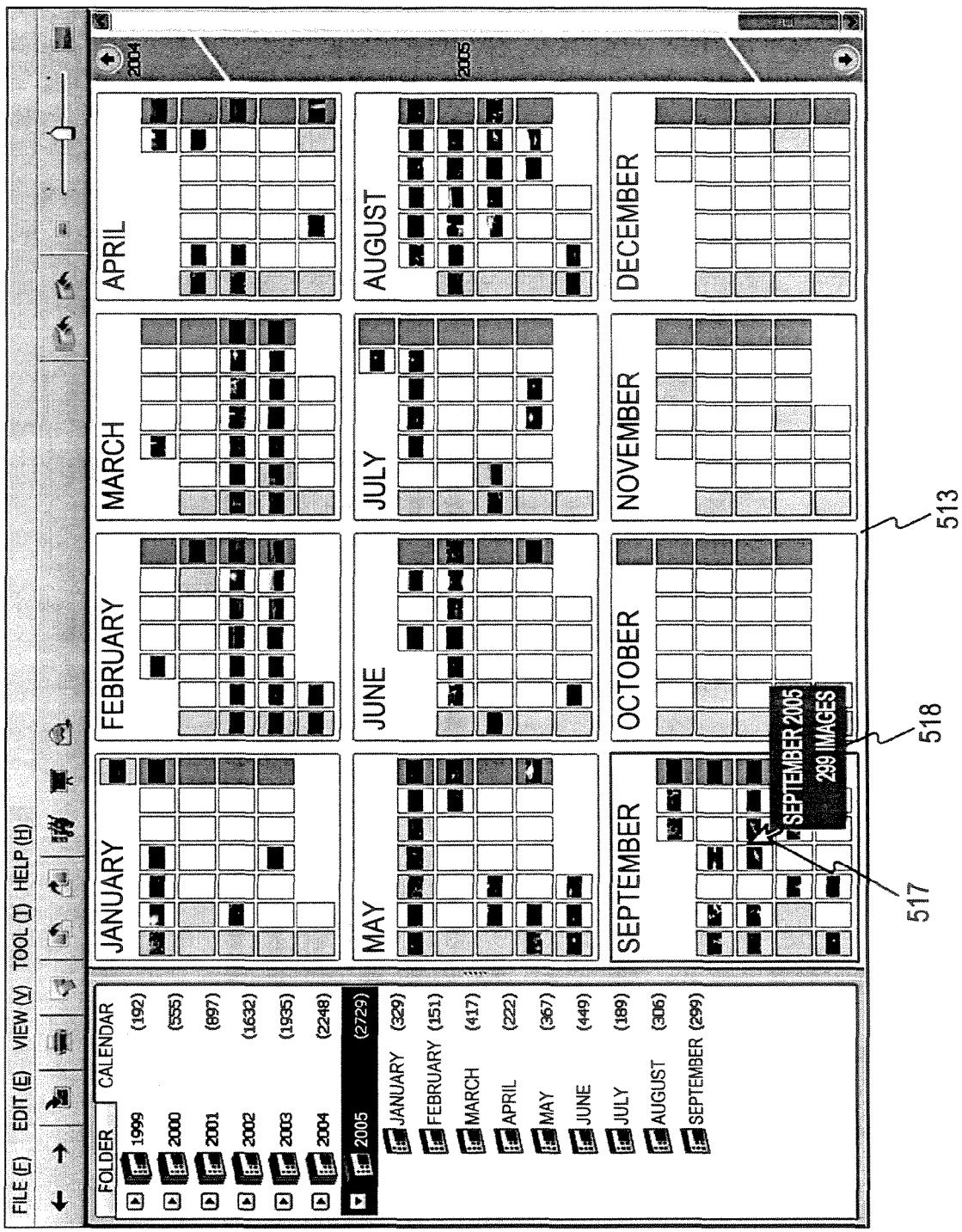
FIG. 8 is a diagram showing an example of a displayed tool tip according to the embodiment of the present invention.

FIG. 8 shows an example of a displayed tool tip according to the embodiment of the present invention. When a cursor 517 is moved to a specific month in the calendar display area 513 of the year display screen 510, the specific month and the number of content files created in that specific month are displayed as a tool tip 518. The tool tip 518 may be displayed for a short time (a few seconds to ten seconds) or may be continuously displayed until the cursor 517 is moved again.

Figure 9:
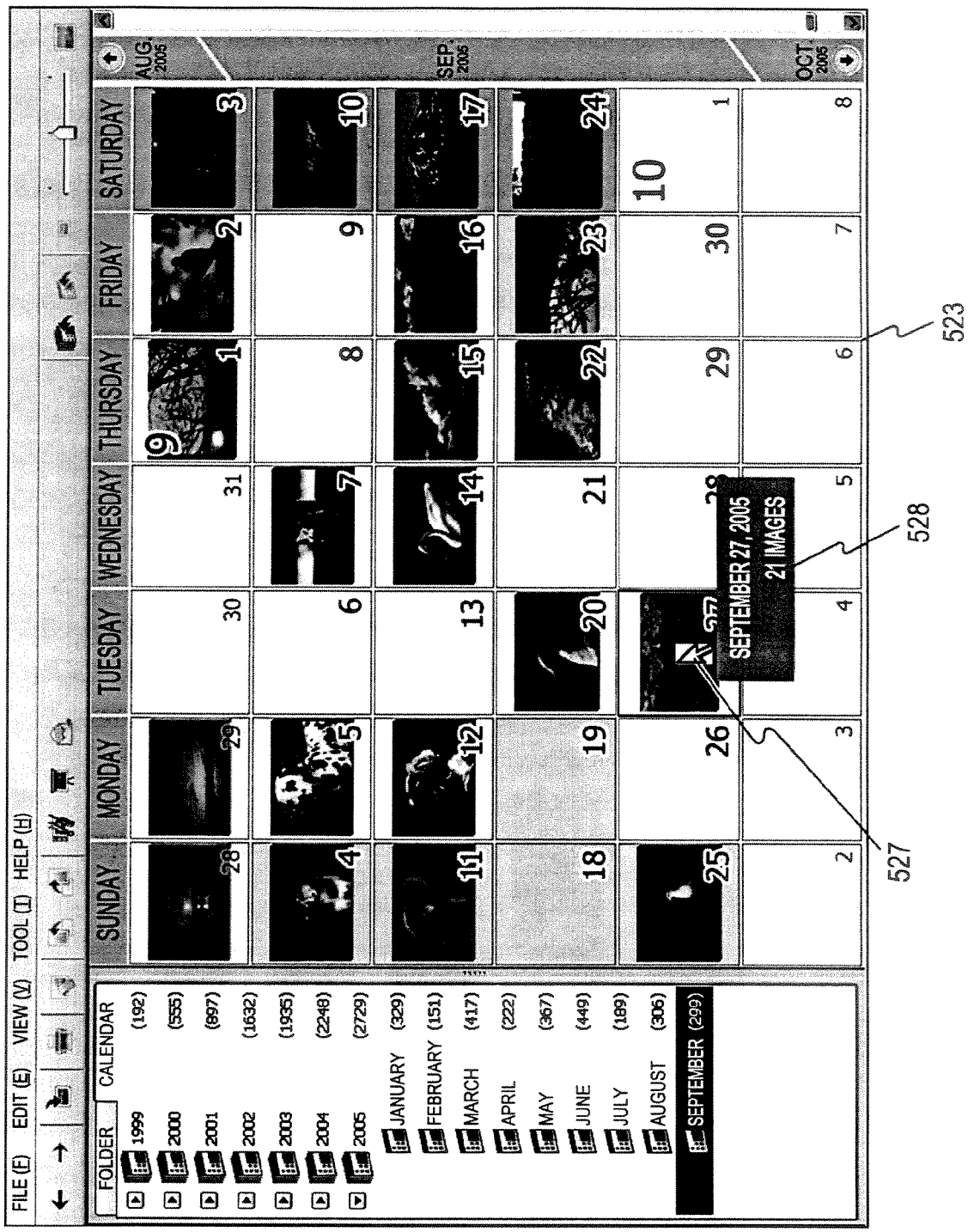
FIG. 9 is a diagram showing another example of the displayed tool tip according to the embodiment of the present invention.

FIG. 9 shows another example of the displayed tool tip according to the embodiment of the present invention. When a cursor 527 is moved to a specific day in the calendar display area 523 of the month display screen 520, the specific day and the number of content files created on that specific day are displayed as a tool tip 528. The time during which the tool tip 528 is displayed is similar to that of the tool tip 518.

Figure 10A:
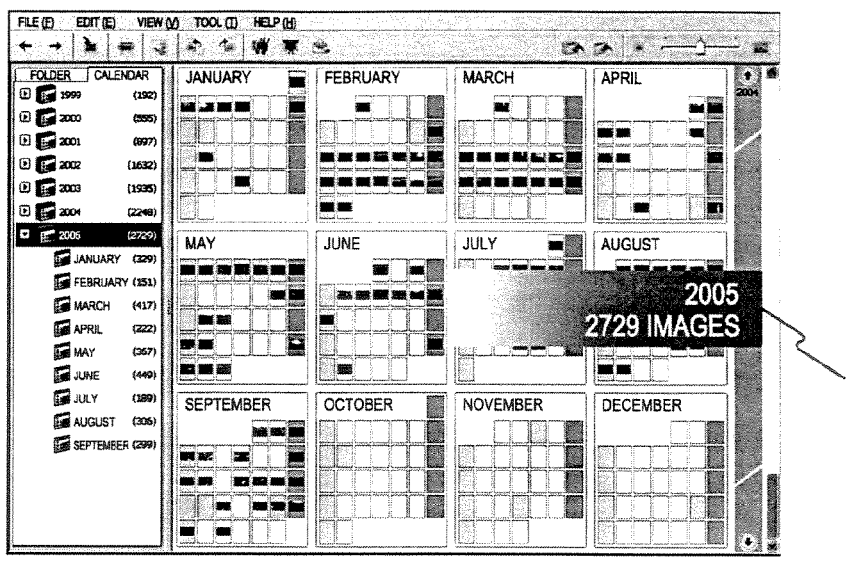
FIGS. 10A to 10C are diagrams showing examples of displayed information superimposed on the calendar according to the embodiment of the present invention.
Figure 10B:
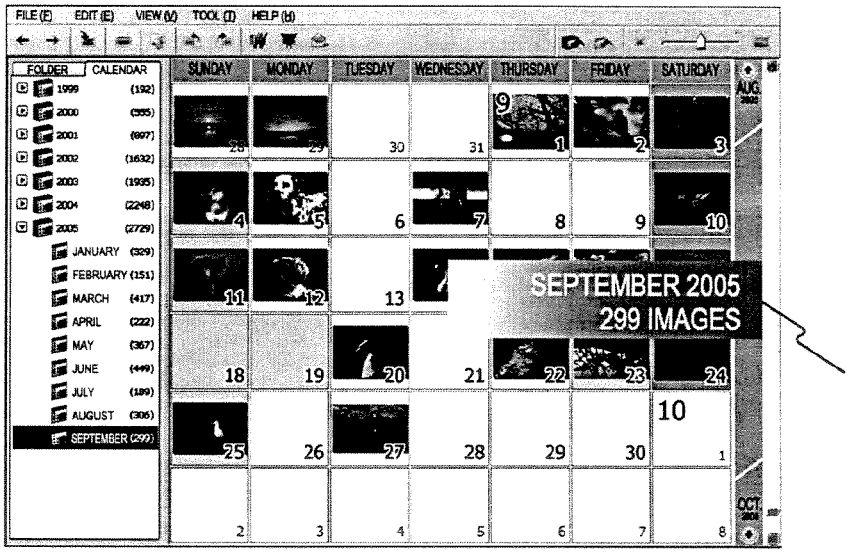
Figure 10C:
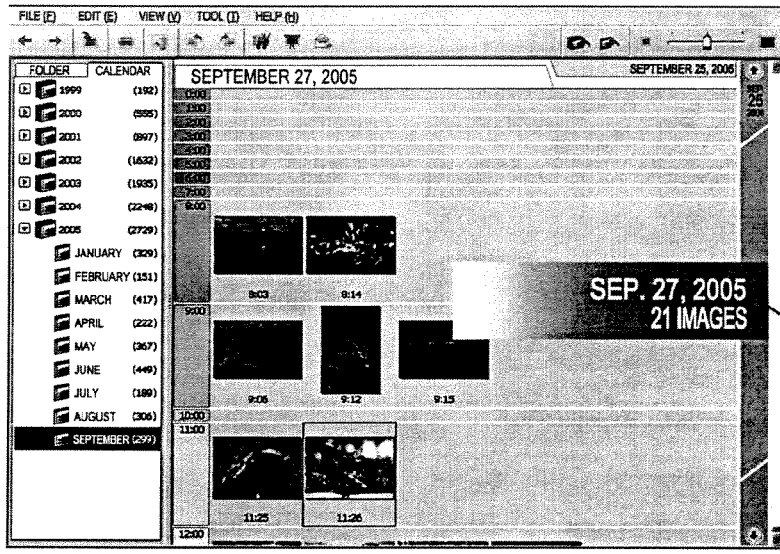

FIGS. 10A to 10C show examples of displayed information superimposed on the calendar according to the embodiment of the present invention. In the embodiment of the present invention, each calendar is continuous over days, months, or years. It thus may be difficult to detect the current display position during scrolling. In the embodiment of the present invention, information about a core unit (in accordance with the units of the time-axis range) is superimposed and displayed on the calendar when the calendar crosses the unit boundary of the time-axis range during scrolling.

FIG. 10A shows an example of the year display screen 510. In this example, when the calendar crosses the year boundary during scrolling, a core year and the number of content files created in that core year are rendered as information 519 to be superimposed and displayed on the calendar.

FIG. 10B shows an example of the month display screen 520. In this example, when the calendar crosses the month boundary during scrolling, a core month and the number of content files created in that core month are displayed as information 529 to be superimposed and displayed on the calendar.

FIG. 10C shows an example of the day display screen 530. In this example, when the calendar crosses the day boundary during scrolling, a core day and the number of content files created on that core day are displayed as information 539 to be superimposed and displayed on the calendar.

The pieces of information 519, 529, and 539 may be temporarily displayed for a short period of time (a few seconds to ten seconds) or may be continuously displayed until the calendar crosses the boundary again.

The operation of the file management apparatus according to the embodiment of the present invention will be described with reference to the drawings.

Figure 11:
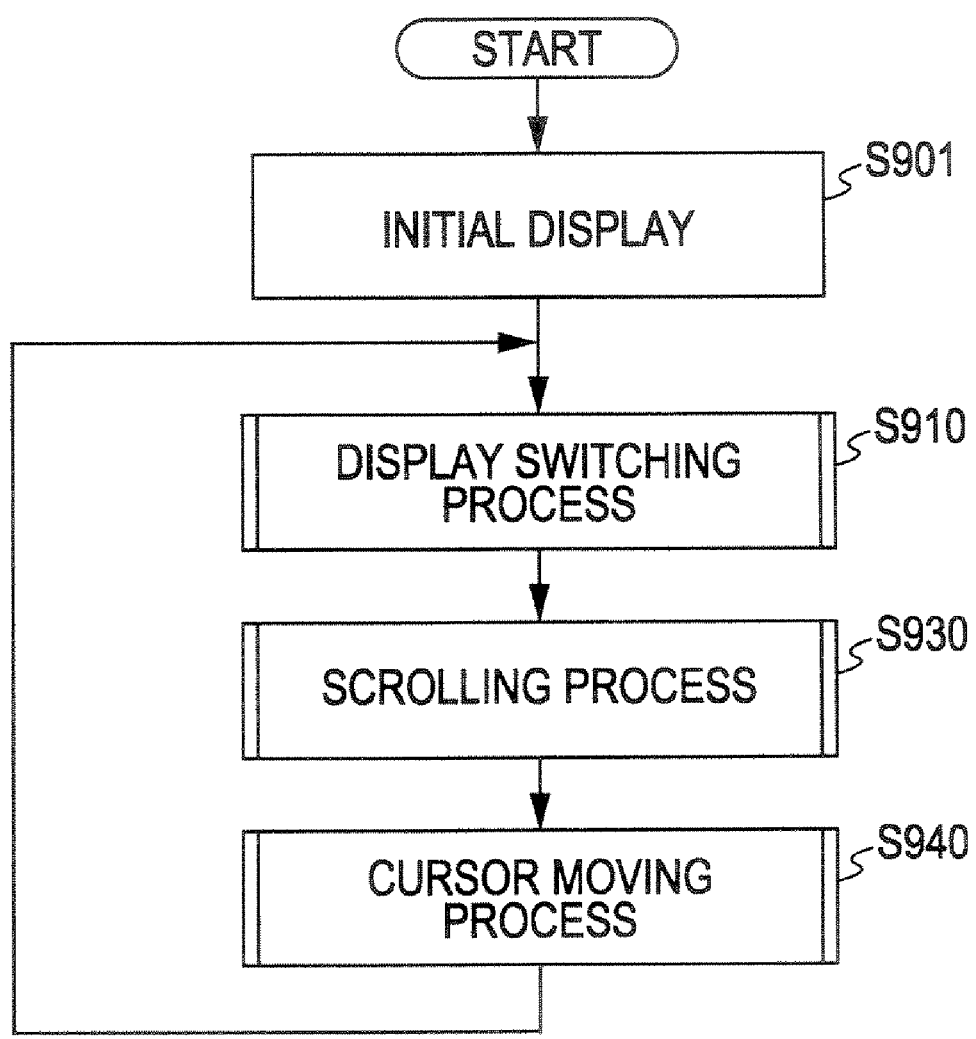
FIG. 11 is a flowchart of an exemplary process performed by the file management apparatus according to the embodiment of the present invention.

FIG. 11 is a flowchart of an exemplary process performed by the file management apparatus according to the embodiment of the present invention. In this case, one of the year display screen 510, the month display screen 520, and the day display screen 530 is displayed initially (step S901).

When the operation receiving unit 170 receives an operation to switch the time-axis range, the controller 180 switches the display screen in accordance with the display state in the display state maintaining unit 190 (step S910). When the operation receiving unit 170 receives a scrolling operation, the controller 180 scrolls the screen (step S930). When the operation receiving unit 170 receives an operation to move the cursor, the controller 180 moves the cursor (step S940).

Figure 12:
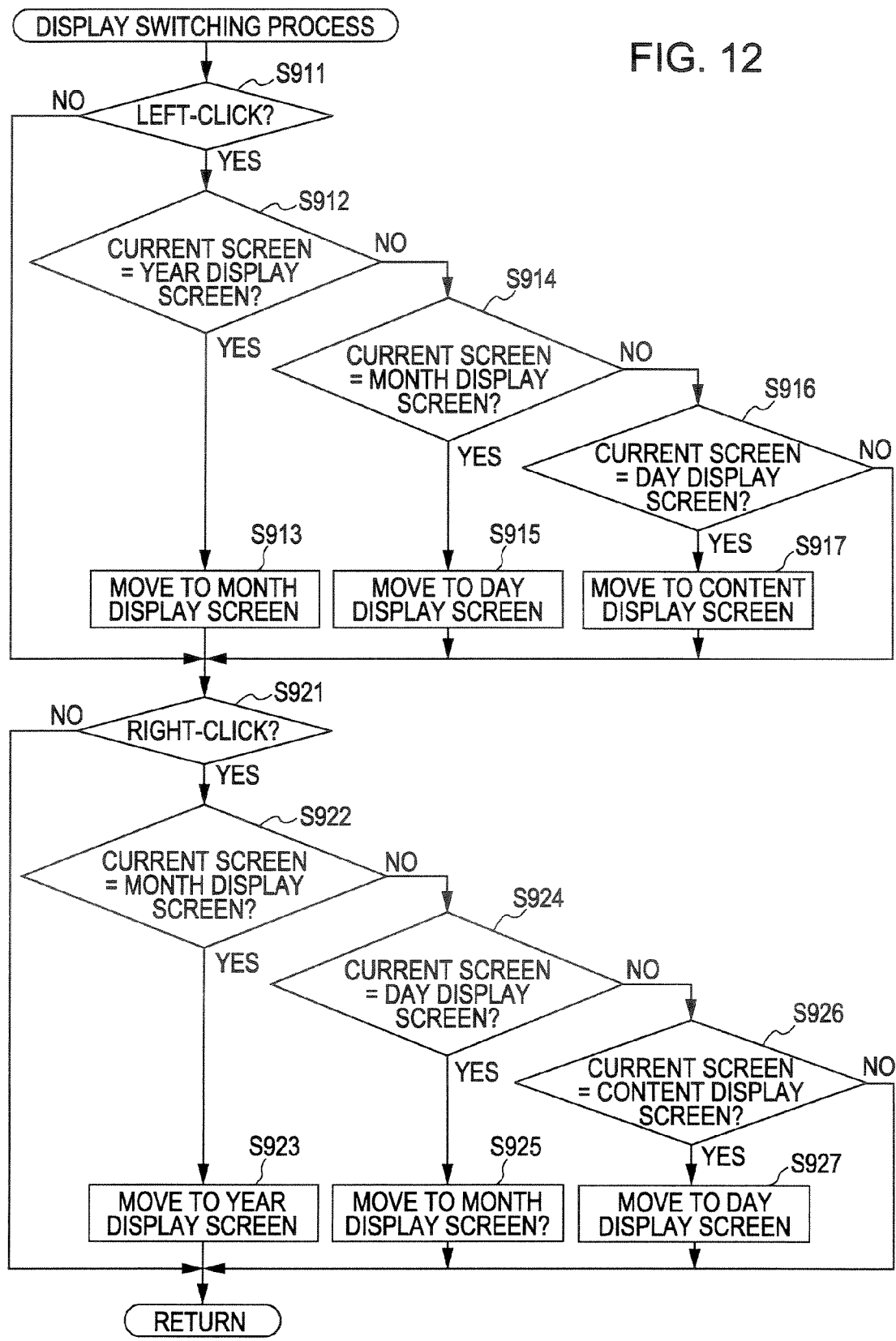
FIG. 12 is a flowchart of an exemplary display switching process according to the embodiment of the present invention.

FIG. 12 is a flowchart of an exemplary display switching process (step S910) according to the embodiment of the present invention. When the operation received by the operation receiving unit 170 is left-clicking (step S911), the controller 180 refers to the time-axis range of the display state in the display state maintaining unit 190 and determines whether the current display screen is the year display screen 510, the month display screen 520, or the day display screen 530 (steps S912, S914, and S916).

When the current display screen is the year display screen 510 (step S912), the controller 180 allows the rendering unit 150 to render the month display screen 520 displaying a month selected by left-clicking (step S913). At this time, the controller 180 allows the obtaining unit 140 to obtain necessary calendar information and thumbnail data from the calendar information storage device 130 and the thumbnail data storage device 120, respectively. Also, the controller 180 updates the display state maintaining unit 190 so that the time-axis range is expressed in units of months.

When the current display screen is the month display screen 520 (step S914), the controller 180 allows the rendering unit 150 to render the day display screen 530 displaying a day selected by left-clicking (step S915). At this time, the controller 180 allows the obtaining unit 140 to obtain necessary calendar information and thumbnail data from the calendar information storage device 130 and the thumbnail data storage device 120, respectively. Also the controller 180 updates the display state maintaining unit 190 so that the time-axis range is expressed in units of days.

When the current display screen is the day display screen 530 (step S916), the controller 180 allows the rendering unit 150 to render the content display screen 540 displaying a content file corresponding to a thumbnail image selected by left-clicking (step S917). At this time, the controller 180 allows the obtaining unit 140 to obtain the necessary content file from the content file storage device 110.

When the operation received by the operation receiving unit 170 is right-clicking (step S921), the controller 180 refers to the time-axis range of the display state in the display state maintaining unit 190 and determines whether the current display screen is the month display screen 520, the day display screen 530, or the content display screen 540 (steps S922, S924, and S926).

When the current display screen is the month display screen 520 (step S922), the controller 180 allows the rendering unit 150 to render the year display screen 510 displaying a year indicated by the display state in the display state maintaining unit 190 (step S923). At this time, the controller 180 allows the obtaining unit 140 to obtain necessary calendar information and thumbnail data from the calendar information storage device 130 and the thumbnail data storage device 120, respectively. Also the controller 180 updates the display state maintaining unit 190 so that the time-axis range is expressed in units of years.

When the current display screen is the day display screen 530 (step S924), the controller 180 allows the rendering unit 150 to render the month display screen 520 displaying a month indicated by the display state in the display state maintaining unit 190 (step S925). At this time, the controller 180 allows the obtaining unit 140 to obtain necessary calendar information and thumbnail data from the calendar information storage device 130 and the thumbnail data storage device 120, respectively. Also the controller 180 updates the display state maintaining unit 190 so that the time-axis range is expressed in units of months.

In the case of the exemplary transition shown in FIG. 3A, when the current display screen is the content display screen 540 (step S916), the controller 180 allows the rendering unit 150 to render the day display screen 530 indicating a day indicated by the display state in the display state maintaining unit 190 (step S927). At this time, the controller 180 allows the obtaining unit 140 to obtain necessary calendar information and thumbnail data from the calendar information storage device 130 and the thumbnail data storage device 120, respectively. Also the controller 180 updates the display state maintaining unit 190 so that the time-axis range is expressed in units of days.

Figure 13:
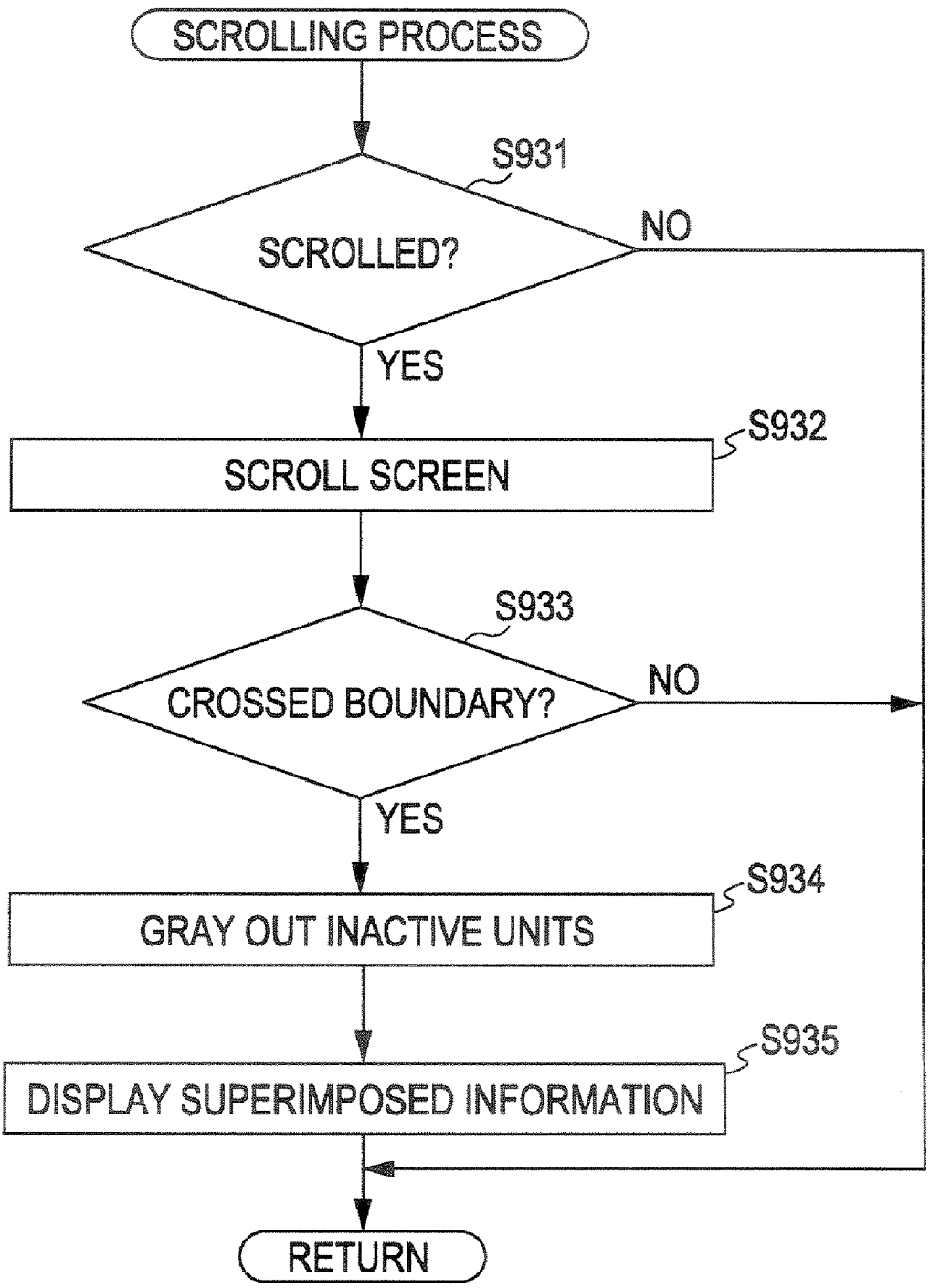
FIG. 13 is a flowchart of an exemplary scrolling process according to the embodiment of the present invention.

FIG. 13 is a flowchart showing an exemplary scrolling process (step S930) according to the embodiment of the present invention. When the operation received by the operation receiving unit 170 is scrolling (step S931), the controller 180 instructs the rendering unit 150 to scroll the display screen (step S932). At this time, the controller 180 updates the display state maintaining unit 190 so that the position included in the display state indicates the scrolled position.

When the calendar crosses the unit boundary of the time-axis range during scrolling (step S933), that is, when the year display screen 510 crosses the year boundary, when the month display screen 520 crosses the month boundary, or when the day display screen 530 crosses the day boundary, the controller 180 allows the rendering unit 150 to render units other than the new core unit (specific year, month, or day) as inactive (e.g., grayed out) (step S934). At the same time, the controller 180 allows the rendering unit 150 to render information to be superimposed and displayed on the calendar, as has been described with reference to FIGS. 10A to 10C (step S935). That is, the controller 180 allows the obtaining unit 140 to obtain information about the new core unit from the thumbnail data storage device 120 and, on the basis of the obtained information, allows the rendering unit 150 to render information to be superimposed and displayed on the calendar.

Figure 14:
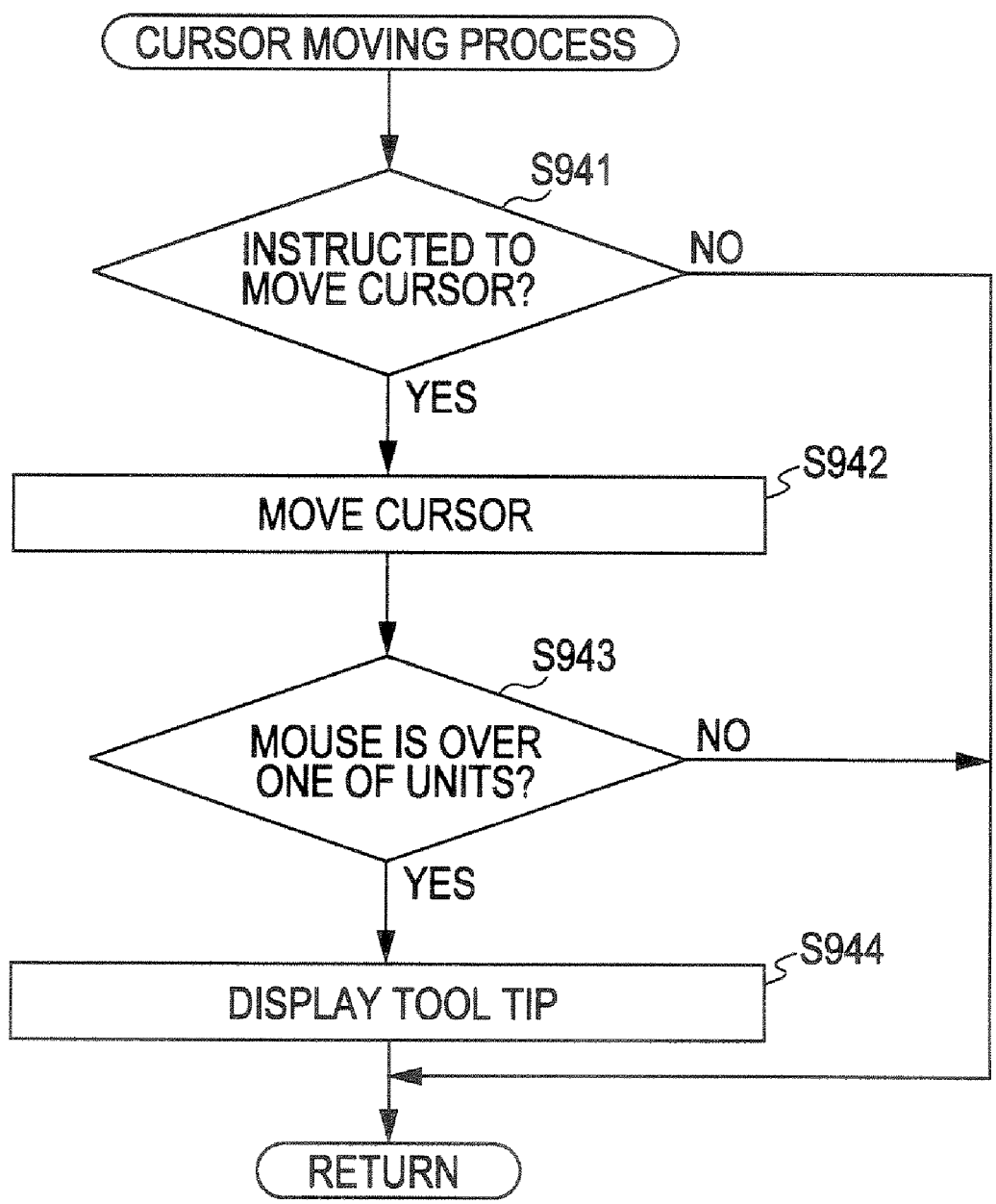
FIG. 14 is a flowchart of an exemplary cursor moving process according to the embodiment of the present invention.

FIG. 14 is a flowchart of an exemplary cursor moving process (step S940) according to the embodiment of the present invention. When the operation received by the operation receiving unit 170 is a cursor moving operation (step S941), the controller 180 allows the rendering unit 150 to move the cursor (step S942).

When the cursor is moved over one of the units of the time-axis range on the display screen (step S943), the controller 180 instructs the rendering unit 150 to render information about that unit as a tool tip, as has been described with reference to FIGS. 8 and 9 (step S944).

According to the embodiment of the present invention, there is provided a user interface that can seamlessly display a calendar over days, months, and years by scrolling the screen with any of the time-axis ranges using the operation receiving unit 170. By maintaining the current display state in the display state maintaining unit 190, when an instruction is given to change the time-axis range, the changed time-axis range and the current position can be detected, and the time-axis range can be switched while maintaining the current position.

The embodiment of the present invention is illustrated by way of example to realize the present invention. Although there is a correspondence between the embodiment and the features of the claims, which will be described below, the present invention is not limited thereto, and various modifications can be made without departing from the spirit and scope of the present invention.

That is, according to an embodiment of the present invention, representative image storage means corresponds to, for example, the thumbnail data storage device 120. Rendering means corresponds to, for example, the rendering unit 150. Display state maintaining means corresponds to, for example, the display state maintaining unit 190. Operation receiving means corresponds to, for example, the operation receiving unit 170. Control means corresponds to, for example, the controller 180.

A first clicking operation corresponds to, for example, a left-clicking operation. A second clicking operation corresponds to, for example, a right-clicking operation.

According to another embodiment of the present invention, representative image storage means corresponds to, for example, the thumbnail data storage device 120. Rendering means corresponds to, for example, the rendering unit 150. Display state maintaining means corresponds to, for example, the display state maintaining unit 190. Operation receiving means corresponds to, for example, the operation receiving unit 170. Control means corresponds to, for example, the controller 180. Display means corresponds to, for example, the display unit 160.

According to another embodiment of the present invention, rendering representative image data of each of a plurality of content files at a position corresponding to a creation time of the content file with a calendar continuous over days, months, and years serving as a background corresponds to, for example, step S901. Receiving a change operation to change a time-axis range of the calendar being displayed and a position thereof, the change operation commonly being a scrolling operation in a time-series direction in any time-axis range, corresponds to, for example, steps S911, S921, and S931. Switching, when the change operation is a first clicking operation, the time-axis range so that the time-axis range is expressed at the position in smaller units corresponds to, for example, steps S913, S915, and S917. Switching, when the change operation is a second clicking operation, the time-axis range so that the time-axis range is expressed at the position in larger units corresponds to, for example, steps S923, S925, and S927.

The processes described in the embodiment of the present invention may be considered as a method having the series of processes or may be considered as a program for allowing a computer to execute the series of processes or as a recording medium having the program recorded thereon.

What is claimed is:

1. A file management apparatus comprising:
   representative image storage means for storing representative image data of each of a plurality of content files in association with a creation time of the content file;
   rendering means for rendering the representative image data at a position corresponding to the creation time with a calendar continuous over days, months, and years serving as a background;
   display state maintaining means for maintaining, as a display state, a time-axis range of the calendar being displayed and the position, the time-axis range being expressed in first units;
   operation receiving means for receiving a change operation to change the display state, the change operation including a common scrolling operation in a time-series direction in any time-axis range, a first clicking operation, and a second clicking operation, the operation receiving means including a first button and a second button, the first button implementing the first clicking operation, and the second button implementing the second clicking operation; and
   control means for controlling, in response to the change operation, the rendering means to render the representative image data on the calendar on a basis of the display state,
   wherein when the operation receiving means receives the first clicking operation from the first button, the control means switches the time-axis range to be expressed in second units that are shorter in time than the first units, and thereafter when the operation receiving means receives the second clicking operation from the second button, the control means switches back the time-axis range to be expressed in the first units, and
   the display state maintaining means maintains the position when switching the time-axis range.

2. The file management apparatus according to claim 1, wherein the first and second units are expressed in one of days, months, or years.

3. The file management apparatus according to claim 2, wherein the rendering means renders an image indicating the first units in accordance with the first units of the time-axis range.

4. The file management apparatus according to claim 2, wherein the rendering means renders units other than a core unit as inactive in accordance with the first units of the time-axis range.

5. The file management apparatus according to claim 4, wherein the core unit is a unit with a largest display area among the first units.

6. The file management apparatus according to claim 4, wherein the rendering means renders information about the core unit when the calendar crosses a boundary of the first units of the time-axis range during the scrolling operation.

7. The file management apparatus according to claim 2, wherein, in the case where the first units are expressed in units of months, when a day on the calendar is selected, the control means switches the time-axis range so that the time-axis range is expressed in the second units of days, and
   wherein, when the creation time belongs to the selected day, the rendering means renders an image indicating the selected day, and, when the creation time does not belong to the selected day, the rendering means renders an image indicating a closest future day to which the creation time belongs.

8. The file management apparatus according to claim 2, wherein, when the first units are expressed in units of days, the rendering means renders the calendar and the representative image data only for a day to which the creation time belongs.

9. The file management apparatus according to claim 2, wherein, when the first units are expressed in units of days, the rendering means renders an image indicating a break point between groups, each group serving as a range of continuous days to which the creation times belong.

10. The file management apparatus according to claim 2, wherein, when the first units are expressed in units of days, the rendering means renders an image to be displayed from the content file corresponding to the representative image data selected on the calendar.

11. The file management apparatus according to claim 10, wherein the rendering means renders, together with the rendered image, representative image data belonging to a group serving as a range of continuous days to which the creation times belong.

12. The file management apparatus according to claim 2, wherein the operation receiving means receives a movement operation to move a cursor, and
   wherein the rendering means renders the cursor in accordance with the movement operation, and, when the cursor is moved over the first units of the time-axis range, the rendering means renders information about the first units.

13. The file management apparatus according to claim 2, wherein the operation receiving means is a mouse including the first button and the second button.

14. An image display apparatus comprising:
- representative image storage means for storing representative image data of each of a plurality of content files in association with a creation time of the content file;
- rendering means for rendering the representative image data at a position corresponding to the creation time with a calendar continuous over days, months, and years serving as a background;
- display state maintaining means for maintaining, as a display state, a time-axis range of the calendar being displayed and the position, the time-axis range being expressed in first units;
- operation receiving means for receiving a change operation to change the display state, the change operation including a common scrolling operation in a time-series direction in any time-axis range, a first clicking operation, and a second clicking operation, the operation receiving means including a first button and a second button, the first button implementing the first clicking operation, and the second button implementing the second clicking operation;
- control means for controlling, in response to the change operation, the rendering means to render the representative image data on the calendar on a basis of the display state; and
- display means for displaying details rendered by the rendering means,
- wherein when the operation receiving means receives the first clicking operation from the first button, the control means switches the time-axis range to be expressed in second units that are shorter in time than the first units, and thereafter when the operation receiving means receives the second clicking operation from the second button, the control means switches back the time-axis range to be expressed in the first units, and
- the display state maintaining means maintains the position when switching the time-axis range.

15. A file management method, implemented on a file management device, comprising:
- rendering, at the file management device, representative image data of each of a plurality of content files at a position corresponding to a creation time of the content file with a calendar continuous over days, months, and years serving as a background;
- receiving, at the file management device, a change operation to change a time-axis range of the calendar being displayed and the position, the change operation including a common scrolling operation in a time-series direction in any time-axis range, a first clicking operation, and a second clicking operation;
- switching, when the receiving receives the first clicking operation from a first button of an input device, the time-axis range from a time-axis range expressed at the position in first units to a time-axis range expressed at the position in second units that are shorter in time than the first units; and
- switching, after switching to the time-axis range expressed in the second units and when the second clicking operation is received from a second button of the input device, the time-axis range so that the time-axis range is expressed at the position in the first units.

16. A non-transitory computer readable storage medium encoded with instruction which, when executed by a computer having a processor, cause the processor to execute a method, said method comprising:
- rendering representative image data of each of a plurality of content files at a position corresponding to a creation time of the content file with a calendar continuous over days, months, and years serving as a background;
- receiving a change operation to change a time-axis range of the calendar being displayed and the position, the change operation including a common scrolling operation in a time-series direction in any time-axis range, a first clicking operation, and a second clicking operation;
- switching, when the receiving receives the first clicking operation from a first button of an input device, the time-axis range from a time-axis range expressed at the position in first units to a time-axis range expressed at the position in second units that are shorter in time than the first units; and
- switching, after switching to the time-axis range expressed in the second units and when the second clicking operation is received from a second button of the input device, the time-axis range so that the time-axis range is expressed at the position in the first units.

17. A file management apparatus comprising:
- a representative image storage device operable to store representative image data of each of a plurality of content files in association with a creation time of the content file;
- a rendering unit operable to render the representative image data at a position corresponding to the creation time with a calendar continuous over days, months, and years serving as a background;
- a display state maintaining unit operable to maintain, as a display state, a time-axis range of the calendar being displayed and the position, the time-axis range being expressed in first units;
- an operation receiving unit operable to receive a change operation to change the display state, the change operation including a common scrolling operation in a time-series direction in any time-axis range, a first clicking operation, and a second clicking operation, the operation receiving unit including a first button and a second button, the first button implementing the first clicking operation, and the second button implementing the second clicking operation; and
- a controller operable to control, in response to the change operation, the rendering unit to render the representative image data on the calendar on a basis of the display state,
- wherein when the operation receiving unit receives the first clicking operation from the first button, the controller switches the time-axis range to be expressed in second units that are shorter in time than the first units, and thereafter when the operation receiving unit receives the second clicking operation from the second button, the controller switches back the time-axis range to be expressed in the first units, and
- the display state maintaining unit maintains the position when switching the time-axis range.

18. The file management apparatus according to claim 1,
- wherein the rendering means renders the representative image data for display in a user interface,
- the control means switches the time-axis range to be expressed in second units that are shorter in time than the first units, when a selection pointer is positioned at a predetermined area of the user interface and the operation receiving means receives the first clicking operation from the first button, and
- the control means switches back the time-axis range to be expressed in the first units, when the selection pointer is positioned anywhere within the user interface and the operation receiving means receives the second clicking operation from the second button.

* * * * *